2,303,645

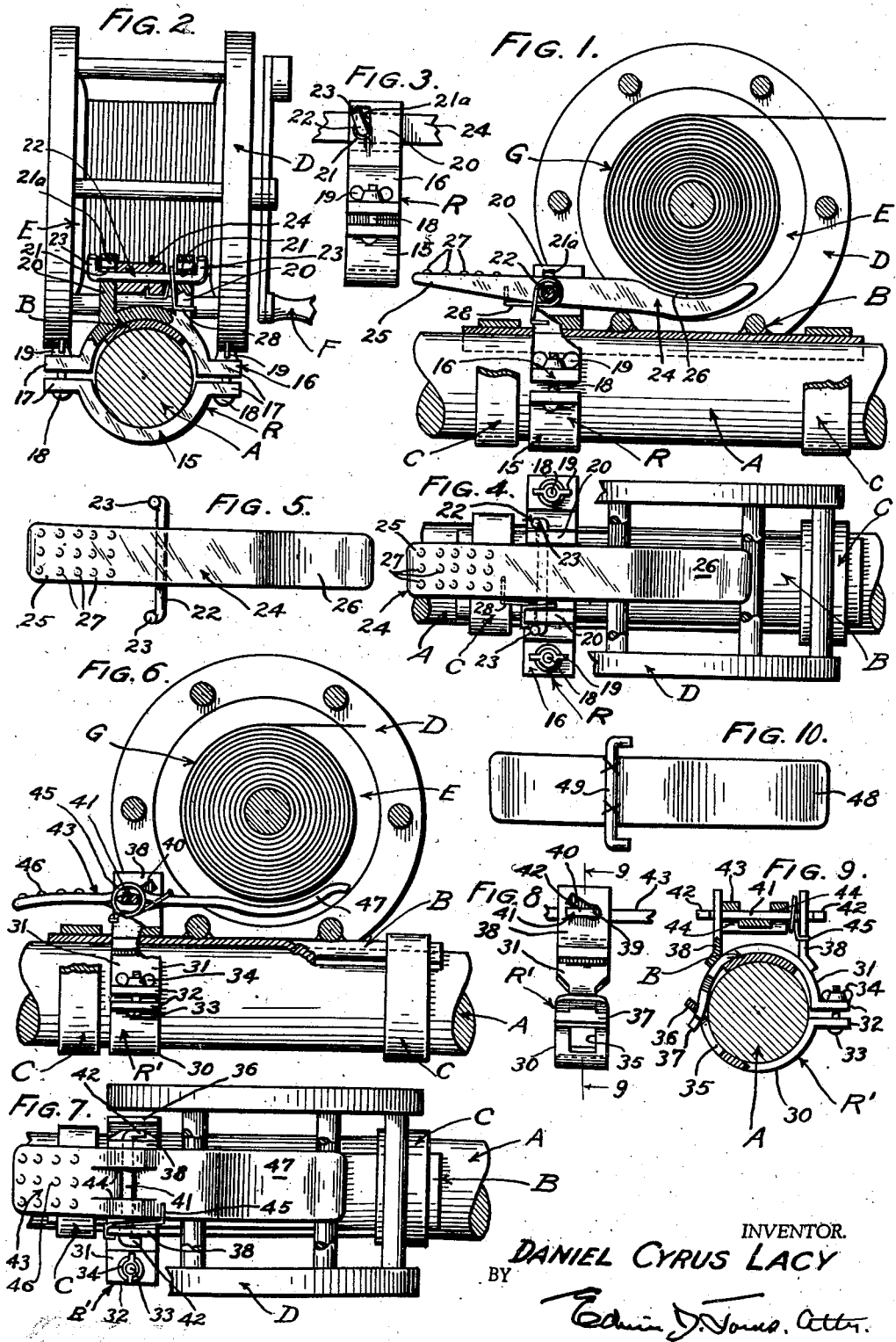
Dec. 1, 1942. D. C. LACY 2,303,645
FISH REEL BRAKE
Filed March 7, 1941
INVENTOR.
DANIEL CYRUS LACY Patented Dec. 1, 1942

UNITED STATES PATENT OFFICE 2,303,645

FISH REEL BRAKE

Daniel Cyrus Lacy, Los Angeles, Calif.

Application March 7, 1941, Serial No. 382,191

5 Claims. (Cl. 242—84.5)

My invention relates to manually operated brakes for controlling the unwinding of the line from a fishing reel during the casting operation, whereby the possibility of the line unreeling faster than it is caused to be paid off by the sinker when casting, and the accompanying entangling of the line can be prevented, and thereby permitting the operator to cast greater distances.

It is the purpose of my invention to provide a reel brake which is in the form of an attachment in that it can be quickly and permanently applied to any conventional form of rod and reel used in deep sea fishing, and readily operated by the thumb of the user to effectively control paying off of the line during casting.

It is also a purpose of my invention to provide a fish reel brake which is characterized by its simplicity of construction, and also its structure permits of its being made of a plastic material so that it is immune to the corrosive action of salt water and salt air.

I will describe only two forms of fish reel brakes, each embodying my invention, and will then point out the novel features thereof in claims.

In the accompanying drawing:

Fig. 1 is a fragmentary and sectional view of a rod and reel having applied thereto one form of brake embodying my invention, with a portion of the brake broken away.

Fig. 2 is a view showing the brake in end elevation and partly in section and applied to a rod and reel.

Fig. 3 is a view showing the rod clamping ring of the brake in side elevation and with the brake lever in place in the ring.

Fig. 4 is a view showing the brake, rod and reel frame in top plan.

Fig. 5 is a detail plan view of the brake lever and pivot pin.

Fig. 6 is a view similar to Fig. 1 showing another form of brake embodying my invention.

Fig. 7 is a view similar to Fig. 4 and showing the brake of Fig. 6.

Fig. 8 is a view similar to Fig. 3 of the brake shown in Fig. 6.

Fig. 9 is a vertical sectional view taken on the line 9—9 of Fig. 8 and as applied to a rod with the latter in section.

Fig. 10 is detail plan view of another brake lever and pivot pin showing another method of securing the latter to the former.

Similar reference characters refer to similar parts in each of the several views.

Referring first to Figs. 1 to 5, A designates a portion of a fishing rod to which a bracket B is secured by a pair of rings C, C. Fixed on the bracket B is a frame D in which is mounted a conventional reel E manually rotatable by a crank F to wind a line G thereon.

The form of reel brake shown in Figs. 1 to 5, comprises a rod-clamping ring R composed of a lower part 15 and an upper part 16, each part semi-circular in form and having flanges 17 at their confronting ends through which bolts 18 extend with winged units 19 for drawing the flanges toward each other to cause the ring parts to firmly clamp the rod A and the bracket B, as best shown in Fig. 2. The ring parts 15 and 16 are made of any suitable plastic material such as "Tenite," in order that they be unaffected by salt air and water, as in the case of metal.

Molded integral with the upper ring part 16 are a pair of ears 20 normally spaced in parallelism and provided with alined openings 21. Alined slots 21a are also formed in the ears and these slots communicate with the openings 21, as best shown in Fig. 3. The openings 21 constitute bearings for a pivot pin 22, while the slots 21a permit the extension through the ears 20 of angular projections 23 on the ends of the pin formed by bending or casting the pin in this form.

The pin 22 may be made of metal or plastic material, with its intermediate portion embedded in a brake lever 24 so that the angular projections 23 are disposed beyond and to opposite edges of the lever. In this manner the pin 22 is fixed to the lever 24 against turning relative thereto, and is preferably embedded in the lever at the time the latter is molded.

The brake lever 24 is preferably tapered in thickness toward one end as shown in Fig. 1, to provide a handle 25 while the other end on its upper side is dished to provide a concave shoe 26 which in the braking position thereof is concentric to the winding of fishing line G. The upper surface of the handle 25 is formed with tits 27 which permit the thumb of the operator to press upon the lever without slipping therefrom.

The lever 24 is mounted between the ears 20 by extending the projections 23 through the slots 21a of both of the ears and then turning the lever to a position in which the projections 23 are disalined with the slots. Thus the projections serve to lock the pin against endwise displacement from the ears even should the ears become sprung to a diverging position. Where the ears are constructed of plastic material possessing a considerable degree of flexibility or resiliency, the possibility is rendered likely of them being sprung during use. It will be noted that the circumferential position of the slots 21a is such that once the lever 24 is mounted between the ears and positioned beneath the reel E, the projections 23 can no longer aline with the slots, and hence, the projections permanently coact with the ears to secure the pin 22 against displacement endwise from the ears.

Once the pin 22 has been applied to the ears 20, as described, the lever 24 is now fulcrumed on the ears to be rocked about the pin as a center, and cause the shoe 26 to engage or disengage the winding of line G on the reel E. By means of a spring 28 of the contracting type the lever 24 is yieldably urged to a position in which the shoe 26 is lowered and out of contact with the line G.

As best shown in Figs. 1 and 2 the spring 28 is in the form of a wire looped about the pin 22 with one end extended into a suitable recess in the underside of the lever, and the other end bent to embrace one edge of one of the ears 20.

In operation, the brake lever 24 being urged by the spring 28, to a position in which the shoe 26 is spaced from the line G, all that is necessary to cause the lever to brake the reel is for the operator to press on the handle end of the lever thus causing the shoe to engage the line as coiled about the reel. Such braking operation of the lever is conveniently effected without the operator changing his grip on the rod, for the operator merely presses the handle end of the lever with his thumb. This affords a nicety of brake control of the reel and simultaneously with the casting operation, whereby not only rotation of the reel as the line is paid off, can be regulated to maintain the line extended from the reel and thus prevent uncoiling of the line by the reel, but as a result the line can be cast a much greater distance in the water than has heretofore been possible.

Referring now to Figs. 6 to 9, I have here shown another form of reel brake the construction of which renders its parts suitable to being made of metal rather than of plastic material as in the first form of my reel brake. As best illustrated in Figs. 8 and 9, the brake comprises a rod-clamping ring R' constructed of metal and having a lower part 30 and an upper part 31. At one end the parts 30 and 31 are connected adjustably by flanges 32, 32 through which a bolt 33 is extended, carrying a winged unit 34 which is adjustable to force the flanges toward each other in causing the ring to clamp the rod A.

The other end of the ring parts 30 and 31 are joined by a connection comprising a slot 35 in the lower ring part 30 adjacent an outwardly flared end 36, and a T-shaped tongue 37 on the confronting and reduced end of the upper ring part 31, which is flared outwardly as shown. By turning the tongue 37 to aline with the slot 35, the head may be extended through the slot, after which, by turning the head to a right-angle position, the two ends of the ring parts are coupled. Thus the aforesaid ends as so coupled operate in conjunction with the flanges 32 and the bolt 33, to firmly clamp the ring on the rod.

The upper ring part 31 has spot welded thereto a pair of upstanding and parallel spaced ears 38. These ears are provided with opening 39 and slots 40 which have the same functions as the openings 21 and the slots 21a in the first form of brake. Similarly, a pivot pin 41, formed at its ends with angular projections 42, is provided to mount a brake lever 43 in the ears 38.

The lever 43 is of the same general form as the lever 24 of Fig. 1, but in this instance it is made of metal and split longitudinally at 44. The pin 41 is made of metal and flat as shown. Thus, by extending the pin transversely through the slits 44 in the manner illustrated, those portions of the lever between and to the outer sides of the slits are placed under tension such as to secure the lever against turning movement on the pin.

With the lever 43 fixed to pin 41, and the pin mounted in the ears 38, the lever is urged to a released position with respect to the coil of line G, by a spring 45 of the expanding type associated with the lever and one of the ears, as shown. Thus by pressing with the thumb on the handle end 46 of the lever the shoe end 47 can be brought into braking engagement with the line G.

In Fig. 10 I have shown a brake lever 48 made of metal, and as an alternative the pin 49 is made round and spot-welded to the lever.

Although I have herein shown and described only two forms of brakes for fish reels, it is to be understood that various changes and modifications may be made herein without departing from the spirit of my invention and the spirit and scope of the appended claims.

I claim:

1. A brake for fish reels, comprising; a rod-clamping ring having a pair of ears spaced and formed with alined slots; a brake lever; a pin fixed to and extending through said lever; angular extension on the ends of said pin extendable through said slots in one circumferential position of said pin and serving to lock said pin in said ears when the pin is moved away from said position; and a spring for urging said lever to a nonbraking position with respect to a reel.

2. A brake for fish reels; comprising; a rod-clamping ring having spaced ears; a pin pivoted at its ends in said ears and having a flat intermediate portion; a brake lever split longitudinally at spaced points to receive said pin portion and secure the pin against turning in said lever; means for locking the pin against movement lengthwise through said ears; and a spring for urging said lever to a predetermined position.

3. A brake for fish reels; comprising; a rod-clamping ring having spaced ears; a pin pivoted at its ends in said ears and having a flat intermediate portion; a brake lever split longitudinally at spaced points to receive said pin portion and secure the pin against turning in said lever; slots in said ears; angular extensions on the ends of said pin extendable through said slots in one circumferential position of said pin and engaging said ears when turned from said position for receiving said pin in said ears; and a spring for urging said lever to a predetermined position.

4. A brake for fish reels; comprising; a rod-clamping ring having two parts, a tongue and slot connection for one end of said parts, and a nut and bolt for the other end of said parts; spaced ears fixed to one of said parts; said ears having alined openings and alined slots communicating with said openings; a pin pivoted at its ends in said openings; angular extensions on the ends of said pin extendable through said slots in one circumferential position of said pin and locking the latter in said ears when the pin is moved away from said position; said pin having an intermediate flat position; a brake lever having portions clamping said pin to cause the lever to turn with the pin; and a spring for urging said lever.

5. A brake for fish reels; comprising; a rod-clamping ring having spaced ears, said ears having alined openings and alined slots communicating with said openings; a pin pivoted at its ends in said openings; angular extensions on the ends of said pin extendable through said slots in one circumferential position of said pin and locking the latter in said ends when the pin is moved away from said position; said pin having an intermediate flat portion; a brake lever having portions clamping said pin to cause the lever to turn with the pin; and a spring for urging said lever.

DANIEL CYRUS LACY.